Aug. 12, 1947.　　　C. S. ROBINSON　　　2,425,565

VIBRATION ABSORPTION UNIT

Filed Dec. 15, 1945

INVENTOR
CECIL S. ROBINSON.

BY

ATTORNEY

Patented Aug. 12, 1947

2,425,565

UNITED STATES PATENT OFFICE 2,425,565

VIBRATION ABSORPTION UNIT

Cecil S. Robinson, New York, N. Y.

Application December 15, 1945, Serial No. 635,302

5 Claims. (Cl. 248—358)

This invention relates to mechanical vibration absorption units of self-contained construction, particularly the special types intended to carry the absorption down to practically invisible vibrations. These precision types of absorption mounts have generally involved a high degree of engineering refinement in order to absorb both low and high frequency oscillation and to avoid resonance at critical frequencies; and when successful, such installations have commanded a high price because of the engineering difficulties involved in the problem.

The principal object of the present invention is to produce an article of manufacture which can be applied as a self-contained unit to a wide variety of uses; and which can be shipped without damage and installed without adjustment by persons unfamiliar with the engineering refinements involved in its operation. From a scientific side it is characterized by a three-way freedom of movement—whereas the conventional sheer type rubber unit is resilient in only one direction. The device also has a built-in damping mechanism to control low frequency oscillations and minimize resonance at critical frequencies. It is further provided with built-in three way snubbers and limit stops so that the customer has nothing additional to install, and so that all vibration paths are intercepted.

Other objects of the invention are to avoid drift or set of the resilient elements, make the device invulnerable to heat, cold and humidity, and protect it against deterioration and damage. Accordingly there is used a combination of materials intended to obtain the permanence and stability of metal without losing the absorptive and protective qualities of rubber. A further object is to avoid the necessity for bonding rubber to metal, so that the units may be made of various metals, not only those capable of bonding. Additional detail objects will become apparent as the description proceeds.

Referring now to the drawings.

Figure 1:
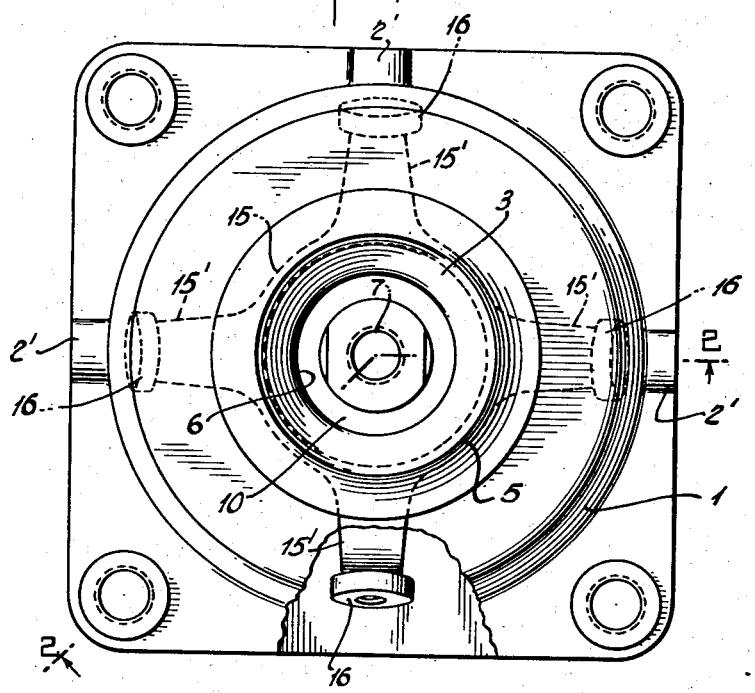
Fig. 1 is a plan view of a unit partly broken away to show the interior.
Figure 2:
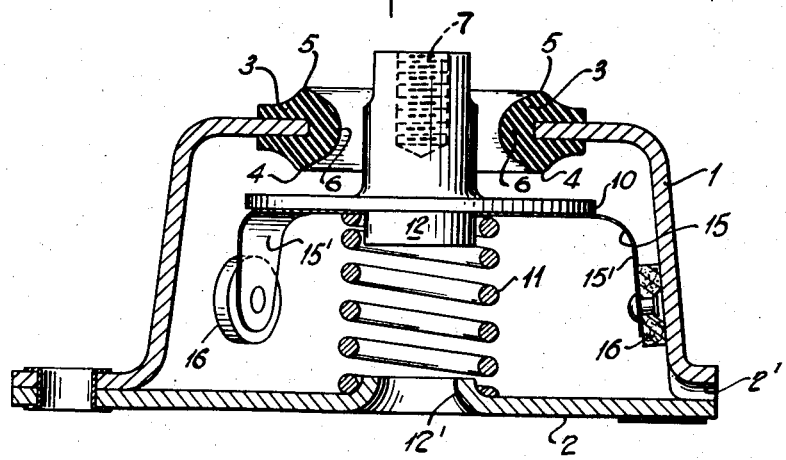
Fig. 2 is a cross-sectional view taken on the line 2—2 of Fig. 1. Similar reference numerals refer to similar parts thruout the various views.

As shown in the drawings, the device consists of a casing 1 having a base 2 which is secured to the casing 1 by any suitable means such as rivets, bolts or welding. Relatively small openings 2' may be provided between the base 2 and the casing 1 to allow airflow and drainage if necessary, but the casing and base substantially enclose the working parts. The upper portion of the casing 1 has an opening surrounded by a resilient ring or grommet 3, whose contour in cross-section is best shown in Fig. 2, being characterised by a lower bead 4, an upper bead 5, and an inwardly projecting cushion 6, so that it can absorb shocks from all directions—up, down, and sideways. This grommet or ring 3 may be made of rubber or any similar resilient material not having hard or metallic properties, as it is important that vibrations shall not be transmitted from the hard casing 1.

Extending thru the opening in the grommet 3 is a stud 7 on which may be mounted the object to be protected from vibration. The stud 7 is tapped for the usual machine screws used in mounting, and the stud is somewhat smaller in diameter than the opening in the grommet so that there is normally some clearance between them. If the object to be mounted is fairly large, such as a radio or seat, several of the cushion units may be used; while if the mounted apparatus is small or light, one or two of the mounting units may suffice. The unit mounts are arranged to absorb vibrations from all directions but principally vertically, or in general along the axis of the stud 7 which may be at various angles if desired. The vertical or axial vibrations are absorbed principally by the spring and damping attachment now to be described.

At a point below the grommet 3 the stud 7 carries a flange 10 which rests on the coil spring 11. The other end of the coil spring 11 stands on the base 2. Projections 12 and 12' on the stud 7 and base 2 respectively serve to center the spring 11 and give it lateral stability. The spring 11 is preferably made of hard, non-corrosive metal such as steel, stainless-steel, or beryllium copper, for example. Such a spring overcomes the tendency to drift and permanent set sometimes found in rubber or similar materials, which are also more affected by unfavorable climatic conditions.

All elastic bodies including metal springs tend to have natural periods of vibration to which they will respond excessively—often building up amplitudes in excess of the vibrations received. They will also respond to harmonics of that natural vibration period. Another problem of vibration absorption devices is lateral as well as vertical stability under unusual shocks and impacts. The direction of the usual vibrations is generally known and the device can be set accordingly; but some provision must be made for unusual impacts from any direction, which though momentary, may have serious consequences.

In order to obtain a damping action to kill harmonic resonance and also increase lateral stability, the main spring 11 is provided with a stabilizer dampener 15 consisting of a spider having several light spring arms 15' bent to give considerable rigidity and each tipped with a resilient pad or cushion 16 engaging the tapered inner sides of the casing 1. One pad 16 is shown in cross-section and the other in perspective for illustration. It has been found that this construction not only centers the stud 7 but also most effectively kills low frequency oscillation and minimizes resonance at critical frequencies. The number of arms 15 may vary in different installations, but three or four are generally sufficient. The pads 16, operating partly by friction and partly in elastic shear, have practically no resonance period; or such resonance period that they may have is of such an entirely different order from that of the spring 11 that the pads 16 exert a very strong dampening effect on any harmonic build-ups.

The resilience of the grommet beads 4, 5 and 6 is also of an entirely different order from that of the main cushion 11 so as to neutralize resonance in that system. This combination of a three-way resilient grommet with a more powerful main spring or cushion makes an adaptable system having both dampening and shock absorbing properties which may be used either with or without the stabilizer 15.

In normal operation the load or object to be stabilized is carried on the stud 7, compressing the spring 11 so that the flange 10 floats at some distance below the bead 4—the system thus absorbing the usual vibrations to which it is subjected, preferably with the aid of the stabilizer 15. If harmonic effects tend to build up excessive vibration at a certain period, the stabilizer 15 is thrown into frictional as well as resilient shear action and promptly tends to dampen the vibration. If the vibrations should reach sufficient amplitude the flange 10 meets the lower bead 4 of the grommet 3, which is so constructed that the greater the impact the more of its surface will come into action. This provides a variable resistance which does not increase on a linear law as does the spring 11, so that the combination tends to break up harmonics rather than increase them. The upper bead 5 acts in a similar manner if struck by the load from above. The grommet also acts as a limiting stop in case of excessive shock from above, below or sideways.

The spring 11 is adapted to absorb lateral vibrations as well as longitudinal vibrations, though it is generally mounted so that the principal vibrations occur in line with the stud 7. Lateral vibrations are absorbed by the spring 11 swaying or bending sideways. If the lateral vibrations attain sufficient amplitude, the inner bead 6 of the grommet 3 then comes into play with a progressive tapered dampening action adapted to absorb considerable vibration, and in conjunction with the main cushion 11 tends to keep vibration and resonance under control.

While I have in the foregoing described certain specific forms by way of example, it will be understood that they are merely for purposes of illustration to make clear the principles of the invention, which is not limited to the particular form shown, but is susceptible to various modifications and adaptations in different installations as will be apparent to those skilled in the art without departing from the scope of the invention as stated in the following claims.

I claim:

1. In a vibration absorption mount, the combination of a casing having an opening, a resilient grommet in said opening adapted to receive impacts from above, below and sideways, a mounting stud extending thru said opening but normally not touching the grommet except under excessive shock or vibration, a flange on said stud, and a main resilient member supporting said flange in said casing, said resilient member being so proportioned that the flange will float out of contact with said grommet under normal operating conditions so as to absorb vibrations reaching the casing, said grommet and flange impinging in case of excessive axial shock or vibration, and said stud and grommet impinging in case of excessive lateral displacement.

2. In a vibration absorption mount, the combination of a casing having an opening, a stud loosely mounted within said opening, a resilient member supporting said stud to absorb vibration, and pads secured to said stud, said pads being in frictional engagement with the interior of the casing.

3. In a vibration absorption mount, the combination of a casing having an opening, a stud loosely mounted within said opening, a resilient member supporting said stud to absorb vibration, and resilient pads secured to said stud for frictional engagement with the interior of the casing in the event of substantial vibration, said pads being sufficiently resilient to provide for absorption of minute vibrations by deformation in shear without sliding.

4. In a vibration absorption mount, the combination of a casing, a main vibration absorption spring, means on said casing for restraining the base of said spring from lateral displacement, a load mounting stud carried by said spring, and pads on said stud frictionally engaging the interior of the casing.

5. In a vibration absorption mount, the combination of a casing, a main vibration absorption spring, means on said casing for restraining the base of said spring from lateral displacement, a load mounting stud carried by said spring, a spider on said stud for centering its upper portion, pads on said spider in contact with the interior of the casing, said pads being capable of motion relative to the casing.

CECIL S. ROBINSON.